US011433539B2

(12) United States Patent
Kobayashi et al.

(10) Patent No.: US 11,433,539 B2
(45) Date of Patent: Sep. 6, 2022

(54) ABNORMALITY DETERMINATION DEVICE AND ABNORMALITY DETERMINATION METHOD

(71) Applicant: Nissan Motor Co., Ltd., Kanagawa (JP)

(72) Inventors: Seiichi Kobayashi, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/264,677

(22) PCT Filed: Jul. 31, 2018

(86) PCT No.: PCT/JP2018/028673
§ 371 (c)(1),
(2) Date: Jan. 29, 2021

(87) PCT Pub. No.: WO2020/026344
PCT Pub. Date: Feb. 6, 2020

(65) Prior Publication Data
US 2021/0331320 A1 Oct. 28, 2021

(51) Int. Cl.
*G06F 11/30* (2006.01)
*B25J 9/16* (2006.01)
(Continued)

(52) U.S. Cl.
CPC ......... *B25J 9/1674* (2013.01); *G01M 99/005* (2013.01); *G05B 19/4155* (2013.01); *G05B 2219/50391* (2013.01); *G06N 20/00* (2019.01)

(58) Field of Classification Search
CPC ..................................................... B25J 9/1674
See application file for complete search history.

(56) References Cited

U.S. PATENT DOCUMENTS 10,317,853 B2 6/2019 Inagaki et al.
10,324,425 B2 6/2019 Takahashi
(Continued)

FOREIGN PATENT DOCUMENTS

JP H05337663 A 12/1993
JP H05337664 A 12/1993
(Continued)

*Primary Examiner* — Phuong Huynh
(74) *Attorney, Agent, or Firm* — Osha Bergman Watanabe & Burton LLP

(57) ABSTRACT

An abnormality determination device includes an input unit to which a device-condition signal output from an operating device is input, a first memory configured to store a determination algorithm for determining a predetermined abnormality of the operating device, an abnormality determination unit configured to determine the predetermined abnormality of the operating device in accordance with the device-condition signal and the determination algorithm, an output unit configured to output a determination result regarding the predetermined abnormality made by the abnormality determination unit to a user, an operation unit configured to receive an input of true-or-false information of whether the determination result is correct from the user, and an update unit configured to update the determination algorithm in accordance with the true-or-false information.

13 Claims, 15 Drawing Sheets

(51) Int. Cl.
*G01M 99/00* (2011.01)
*G05B 19/4155* (2006.01)
*G06N 20/00* (2019.01)

(56) References Cited

U.S. PATENT DOCUMENTS

| | | |
|---|---|---|
| 2014/0201571 A1 | 7/2014 | Hosek et al. |
| 2017/0031329 A1* | 2/2017 | Inagaki ................ G05B 15/02 |
| 2018/0107174 A1* | 4/2018 | Takahashi ............... G05B 9/02 |
| 2018/0147735 A1 | 5/2018 | Kuno et al. |
| 2019/0265657 A1 | 8/2019 | Inagaki et al. |

FOREIGN PATENT DOCUMENTS

| | | |
|---|---|---|
| JP | 2012-009064 A | 1/2012 |
| JP | 5199478 B2 | 5/2013 |
| JP | 2015112631 A | 6/2015 |
| JP | 201733526 A | 2/2017 |
| JP | 201865221 A | 4/2018 |
| WO | 2016194029 A1 | 12/2016 |

* cited by examiner

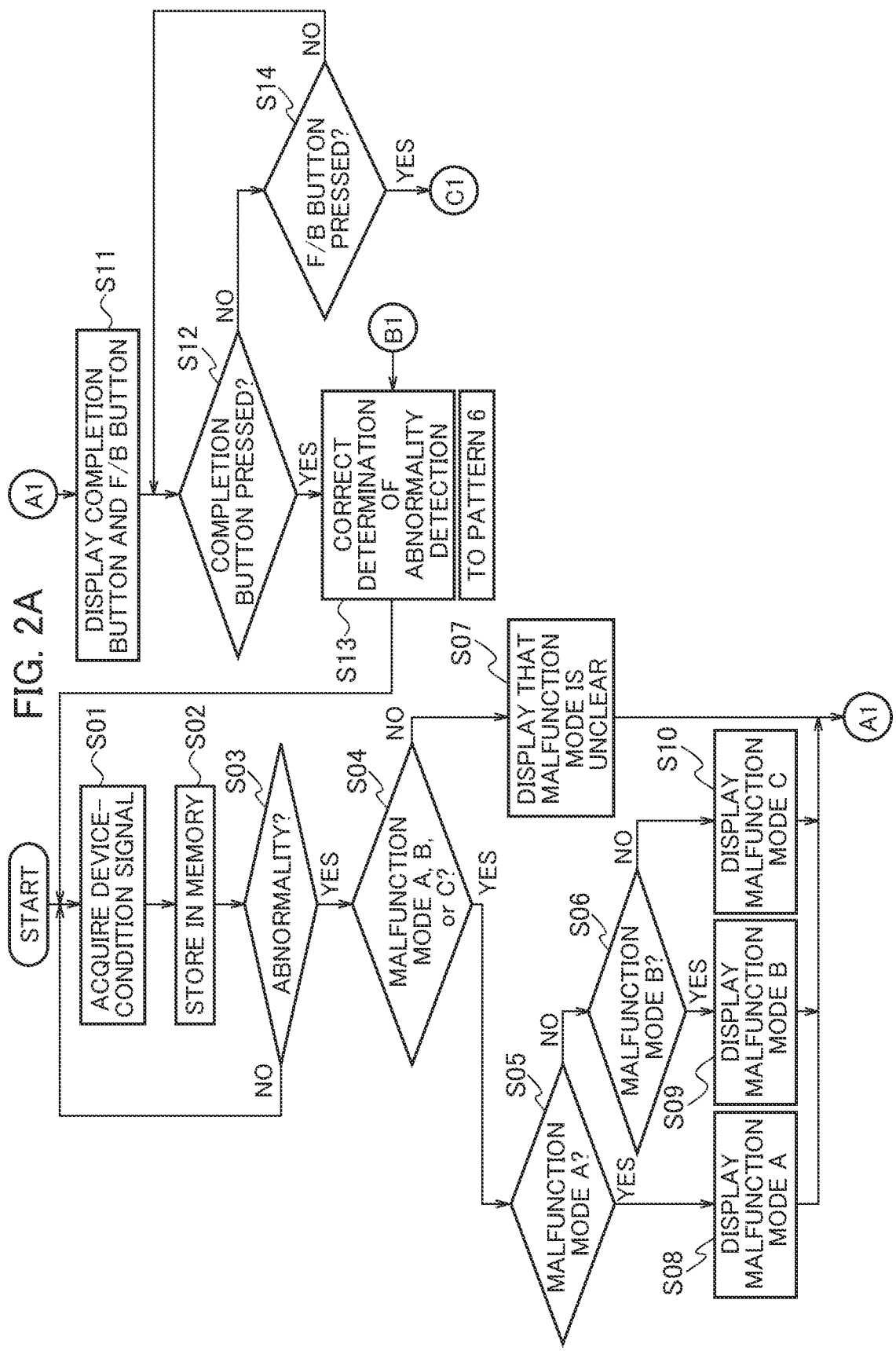

FIG. 6A

G17
- ■ FB THAT MALFUNCTION A IS WRONG DETERMINATION
- ■ CORRECT DETERMINATION ALGORITHM
- ■ REGISTER IN MALFUNCTION ANALYSIS DB
- ■ PLEASE REGISTER MALFUNCTION MODE WHEN CONFIRMED

○ RETURN

FIG. 6B

G18
- ■ FB THAT MALFUNCTION A IS WRONG DETERMINATION
- ■ CORRECT DETERMINATION ALGORITHM
- ■ REGISTER IN MALFUNCTION ANALYSIS DB
- → PLEASE REGISTER MALFUNCTION MODE WHEN CONFIRMED

○ RETURN

FIG. 20

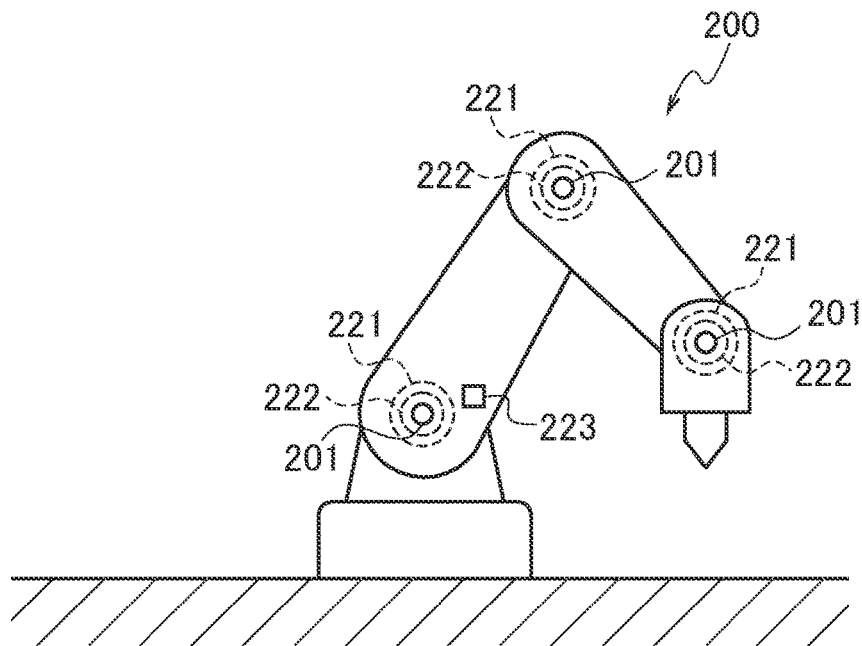

FIG. 21

| ACCELERATION / DRIVE FORCE | INCREASE | NO CHANGE | DECREASE |
|---|---|---|---|
| INCREASE | INTERFERENCE BETWEEN COMPONENTS | ABNORMALITY OF IRON POWDER CONCENTRATION | ABNORMALITY OF ROTATING MECHANISM |
| NO CHANGE | ABNORMALITY OF MACHINE PART | NORMAL | ABNORMALITY OF COMPONENT OTHER THAN ROTATING MECHANISM OR SPEED REDUCER |
| DECREASE | LACK OF GREASE | LEAKAGE OF GREASE | GREASE ADDITION AND CONFIRMATION OF EFFECT |

ABNORMALITY DETERMINATION DEVICE AND ABNORMALITY DETERMINATION METHOD

TECHNICAL FIELD

The present invention relates to an abnormality determination device and an abnormality determination method.

BACKGROUND ART

Monitoring devices are known that monitor operating conditions such as laser welding (refer to Patent Documents 1 and 2). The monitoring devices lean monitoring data in a normal state and in an abnormal state through a neural network, for example, and determine the type of abnormality. The monitoring devices choose the type of abnormality so as to learn a normal standard or an abnormal standard of the abnormality chosen.

CITATION LIST

Patent Literature

Patent Document 1: Japanese Unexamined Patent Application Publication No. H05-337663
Patent Document 1: Japanese Unexamined Patent Application Publication No. H05-337664

SUMMARY OF INVENTION

Technical Problem

The abnormal standard is created by an operator in accordance with processing results obtained from the past monitoring data in the abnormal state so as to cause a machine to learn the abnormal standard. The operator needs to input the data creating the standard one by one for each type of abnormality so as to store the abnormal standard, which is a lot of work imposed on the operator.

In view of the foregoing problem, the present invention provides an abnormality determination device and an abnormality determination method capable of updating a determination algorithm while avoiding an excessive load of inputting data imposed on a user.

Technical Solution

An aspect of the present invention provides an abnormality determination device including an input unit to which a signal output from an operating device is input, a first memory configured to store a determination algorithm for determining a predetermined abnormality of the operating device, an abnormality determination unit configured to determine the predetermined abnormality of the operating device in accordance with the signal and the determination algorithm, an output unit configured to output a determination result regarding the predetermined abnormality made by the abnormality determination unit to a user, an operation unit configured to receive an input of true-or-false information of whether the determination result is correct from the user, and an update unit configured to update the determination algorithm in accordance with the true-or-false information.

Advantageous Effects

The aspect of the present invention can update the determination algorithm while avoiding an excessive load of inputting data imposed on the user.

BRIEF DESCRIPTION OF DRAWINGS

FIG. 2A is a flowchart showing an example of operation of the abnormality determination device illustrated in FIG. 1A (Part 1).
FIG. 6A is a diagram showing an example of screen G17 displayed on an output unit 4 when (1-1) button is pressed.
FIG. 6B is a diagram showing an example of screen G18 displayed on the output unit 4 when (1-2) button is pressed.

FIG. 20 is a schematic diagram showing an example of a configuration of an operating robot 200 as a target for abnormality determination.

FIG. 21 is an example of a table used when a type of abnormality is determined.

DESCRIPTION OF EMBODIMENTS

Figure 1A:
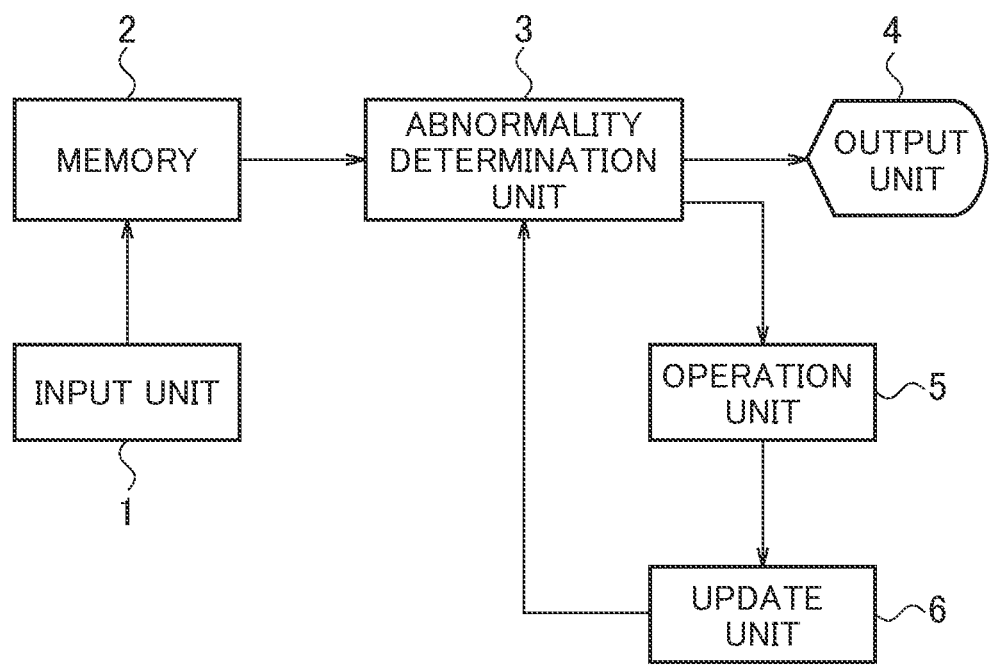
FIG. 1A is a block diagram illustrating a schematic configuration of an abnormality determination device according to an embodiment.

One or more embodiments will be described below with reference to the drawings. The same elements illustrated with reference to the drawings are indicated by the same reference numerals, and overlapping explanations are not repeated below.

An abnormality determination device according to one embodiment is a device for determining abnormality of an operating device which executes predetermined operations. For example, the abnormality determination device determines the presence or absence of abnormality and a type of abnormality of an operating robot 200 (an example of the operating device) which is a multi-axis machine for assembling vehicles. Before explaining the abnormality determination device, the operating robot 200 as a target for abnormality determination is described below.

A configuration of the operating robot 200 as a target for the abnormality determination is described with reference to FIG. 20. The operating robot 200 includes a plurality of motor drive systems which are joint shafts 201 serving as operating shafts. The operating robot 200 is driven by servo motors 221 (simply referred to below as "motors") via speed reducers 222. The motors 221 include pulse coders (pulse generators or encoders) as an example attached as detectors for detecting a rotation angle position and a rotation speed. Various types of tools can be removably attached to a tip of a robot arm via a changer. Examples of tools include a spot welding machine or a laser welding machine serving as an operating tool for welding, and a work hand serving as an operating tool for holding targets to be processed. The "predetermined operations" as used herein include a welding operation and a holding operation.

A sensor 223 is arranged at a part adjacent to the speed reducers 222 that detects acceleration which is a magnitude of oscillations. The sensor 223 samples a waveform (an acceleration signal) indicating oscillations at the arranged part of the sensor 223 at predetermined sampling intervals. The sampled acceleration signal is an example of a signal (a device-condition signal) indicating a condition of the speed reducers 222 as a part of the operating robot 200. The sensor 223 is not limited to the acceleration sensor for detecting the acceleration, and may be any other sensor capable of detecting a condition of a predetermined part of the device. For example, a sensor may be used that detects a speed or a displacement of the predetermined part so as to detect a magnitude of oscillations. Various kinds of sensors can be used that can acquire a change in attitude in a time-series manner, such as a piezoelectric sensor, an angular velocity sensor, and a gyrosensor. The signal indicating the magnitude of oscillations is output to the abnormality determination device.

The operating robot 200 is controlled by a robot controller (not illustrated) so as to execute the predetermined operations. The robot controller is implemented by a multi-purpose controller including a central processing unit (CPU), a memory, and an input-output unit. The robot controller stores and outputs a magnitude, a time, and a timing of a current flowing through the motors 221 in operation to control the motors 221 so as to cause the operating robot 200 to execute the predetermined operations. The robot controller controls the motors 221 to rotate (move) in accordance with the rotation speed and a command value of torque. The speed reducers 222 move in association with the movement of the motors 221. The robot controller generates a signal (another example of the device-condition signal) indicating a drive force derived from disturbance in the motors 221, which is a magnitude of a fluctuation component with respect to the command value of the torque (also referred to as disturbance torque), in accordance with the current flowing through the motors 221. The signal indicating the magnitude of the disturbance torque is output to the abnormality determination device. The abnormality determination device is connected to the operating robot 200 via a communication line in a wired or wireless manner. The abnormality determination device may be installed in the same site and the same facility as the operating robot 200, or may be installed at a remote place distant from the operating robot 200.

The device-condition signal output from the operating robot 200 as an example of the operating device is not limited to the signal indicating the magnitude of oscillations and the signal indicating the magnitude of the disturbance torque. The device-condition signal includes all of the signals which indicate the condition of the operating device and are effective for the determination of abnormality.

A schematic configuration of the abnormality determination device according to the embodiment is described below with reference to FIG. 1A. The abnormality determination device is connected to the operating robot illustrated in FIG. 20 via a communication line in a wired or wireless manner. The signal (the device-condition signal) output from the operating robot is input to the abnormality determination device so as to determine whether the operating robot has an abnormality in accordance with the device-condition signal. The abnormality determination device may be installed in the same manufacturing facility as the operating robot, or may be installed in a remote place outside the manufacturing facility.

As illustrated in FIG. 1A, the abnormality determination device includes an input unit 1, a memory 2 (a first memory), an abnormality determination unit 3, an output unit 4, an operation unit 5, and an update unit 6. The signal (the device-condition signal) output from the operating device (the operating robot) executing the predetermined operations is input to the input unit 1.

The memory 2 stores a determination algorithm for determining predetermined abnormality of the operating robot. The term "predetermined abnormality" refers to abnormality of which type is preliminarily determined, namely, refers to a prescribed malfunction mode. The term "prescribed malfunction mode" herein indicates a malfunction type which is characteristic of the operating robot as a target for the abnormality determination, and is presumed to be a malfunction type in which a sign of malfunction can be preliminarily determined. Examples of the prescribed malfunction mode in the operating robot include a cutoff of a cable (cable cut), an untied cable, insufficient welding (welding less), servo-gun cracks, poor welding, and reducer deterioration. The determination algorithm includes a determination rule preliminarily determined so that the computer determines the predetermined abnormality of the operating robot. The determination algorithm and the determination rule include various kinds of data such as various functions and various parameters. The determination algorithm is described in detail below.

The abnormality determination unit 3 determines the predetermined abnormality of the operating robot in accordance with the device-condition signal and the determination algorithm. In particular, the abnormality determination unit 3 determines whether the predetermined abnormality is caused in the operating robot. The abnormality determination unit 3 determines the type of the abnormality, which is the type of the malfunction mode, when the abnormality is caused.

The abnormality determination unit 3 in particular can be implemented by a microcomputer including a CPU as an example of a controller, a memory (a main storage device), and an input-output unit. A computer program (an abnormality determination program) installed on the microcomputer is executed so as to cause the microcomputer to function as the abnormality determination unit 3. The CPU in the microcomputer thus serves as an information processing unit included in the abnormality determination unit 3. While this embodiment is illustrated with the case in which the software is installed to implement the abnormality determination unit 3, dedicated hardware for executing various kinds of information processing may be prepared to implement the abnormality determination unit 3. The dedicated hardware includes an application-specific integrated circuit (ASIC) configured to execute the functions described in the embodiment or conventional circuit components. The abnormality determination device 3 is connected to an auxiliary storage device (the memory 2) such as a magnetic disk, an optical disk, a magneto-optical disk, and a flash memory, the output unit 4, the operation unit 5, and the update unit 6 via communication lines in a wired or wireless manner. The input-output unit of the microcomputer is an example of the input unit 1 illustrated in FIG. 1A.

The output unit 4 outputs a determination result regarding the predetermined abnormality obtained by the abnormality determination unit 3 (also simply referred to below as a "determination result"). For example, the output unit 4 is a display device including a display screen that the user using the abnormality determination device can visually recognize, and displays the determination result regarding the predetermined abnormality on the display screen. The output unit 4 thus can inform the user of the determination result regarding the predetermined abnormality. The display screen is described in detail below.

The operation unit 5 receives true-or-false information of whether the determination result is correct input by the user (also referred to below as "true-or-false information). The operation unit 5 is a terminal that the user can operate. The abnormality determination device is presumed to allow the user to check the operations of the operating robot through maintenance work (including examination, inspection, and repair) made after the determination of abnormality, regardless of the determination result of the type of the malfunction, until learning by management proceeds sufficiently. Namely, the abnormality determination device is presumed to cause the maintenance work on the operating robot to be executed by the user (maintainer) in accordance with the determination result. The user can make the own decision of whether the determination result made by the abnormality determination unit 3 is correct through the maintenance work. The user can also input the true-or-false information of whether the determination result made by the abnormality determination unit 3 is correct via the operation unit 5. When the determination result is wrong, the user can execute an operation of correcting the determination (feedback). The present embodiment is illustrated with a tablet terminal device including a display unit with a touch panel serving as a user interface (UI) in which the output unit 4 and the operation unit 5 are integrated together. The tablet terminal device is connected to the abnormality determination unit 3, the memory 2, and the update unit 6 via communication lines in a wired or wireless manner.

The update unit 6 updates the determination algorithm stored in the memory 2 in accordance with the true-or-false information received by the operation unit 5. The phrase "update of the determination algorithm" encompasses the update of the determination rule included in the determination algorithm, and the update of the data such as functions and parameters included in the determination algorithm and the determination rule. The update unit 6 corrects the determination algorithm so as not to repeat a wrong determination if the determination result made by the abnormality determination unit 3 is wrong. When the determination result made by the abnormality determination unit 3 is correct, the update unit 6 builds up the determination algorithm so as to repeatedly make a correct determination. The update of the determination algorithm includes the correction of the determination algorithm and the buildup of the determination algorithm.

The process of the data processing by the abnormality determination device illustrated in FIG. 1A is described with reference to FIG. 1B. The device-condition signal is input to the input unit 1. For example, the device-condition signal is input to the input unit 1 once an hour from one operating robot. The abnormality determination device determines the abnormality of several tens to several hundreds of operating robots. The abnormality determination device thus receives several tens to several hundreds of device-condition signals input per hour. All of the device-condition signals input are stored in the memory 2 as raw data D01.

The abnormality determination unit 3 illustrated in FIG. 1A includes an abnormality detector 3a for determining whether the predetermined abnormality is caused in the operating robot, and a malfunction mode sorter 3b for determining the type of the abnormality (the type of the malfunction mode) when caused in the operating robot. The determination algorithm 7 includes a detection algorithm 7a (a first determination algorithm) for determining the presence or absence of the predetermined abnormality of the operating robot, and a sorting rule 7b (a second determination algorithm) for determining the type of the abnormality caused in the operating device.

The abnormality detector 3a determines the presence or absence of the predetermined abnormality of the operating robot in accordance with the raw data D01 as the device-condition signal and the detection algorithm 7a. The abnormality detector 3a compares the raw data D01 with a reference signal, for example. The reference signal is a parameter or data included in the detection algorithm 7a, and is the device-condition signal output when the operating robot is in a normal state, for example. The abnormality detector 3a determines that the predetermined abnormality is caused in the operating robot when an average of deviations between the raw data D01 and the reference signal exceeds a predetermined threshold, for example. The detection algorithm 7a includes not only a specific method of determining the presence or absence of the abnormality described above (the determination rule), but also the parameters or the data such as the "reference signal" and the "predetermined threshold" used in this method.

The determination result (ST1) indicating that the abnormality is detected is displayed on the output unit 4 as an abnormality display alarm 4a. The device-condition signal indicating the detection of the abnormality is stored in the memory 2 as abnormality data D02. The malfunction mode sorter 3b determines the type of the abnormality caused in the operating robot in accordance with the abnormality data D02 as the device-condition signal and the sorting rule 7b. The malfunction mode sorter 3b can determine the type of the abnormality by combining several pieces of the abnormality data D02. For example, the malfunction mode sorter 3b combines the signal indicating the magnitude of oscillations acquired by the sensor 223 and the signal indicating the magnitude of the disturbance torque generated by the robot controller so as to determine the type of the abnormality.

The malfunction mode sorter 3b can determine the type of the abnormality while referring to a table illustrated in FIG. 21 as an example of the data included in the sorting rule 7b. FIG. 21 is the table in which the type of abnormality is matched with a state of change in the acceleration and the drive force. The table illustrated in FIG. 21 is stored in the memory 2.

The term "acceleration" indicates the magnitude of the acceleration signal detected by the sensor 223, namely, indicates the magnitude of oscillations at a part of the operating robot at which the sensor 223 is arranged. The term "increase" in the "acceleration" refers to a state in which the oscillations increase with a lapse of time. The term "decrease" in the "acceleration" refers to a state in which the oscillations decrease with a lapse of time. The term "no change" in the "acceleration" refers to a state in which the oscillations have not changed.

The term "drive force" indicates the magnitude of the disturbance torque caused at the moving part of the operating robot, and corresponds to the signal indicating the magnitude of the disturbance torque generated by the robot controller. The term "increase" in the "drive force" refers to a state in which the disturbance torque increases with a lapse of time. The term "decrease" in the "drive force" refers to a state in which the disturbance torque decreases with a lapse of time. The term "no change" in the "drive force" refers to a state in which the disturbance torque has not changed.

The malfunction mode sorter 3b determines the type of the abnormality as follows while referring to the table illustrated in FIG. 21. For example, when the magnitude of oscillations has not changed and the magnitude of the disturbance torque decreases with a lapse of time, the malfunction mode sorter 3b determines the type of the abnormality as "leakage of grease". The malfunction mode sorter 3b refers to the table illustrated in FIG. 21 so as to determine the type of the malfunction mode (abnormality) in accordance with the combination of the change in the oscillations with time and the change in the disturbance torque with time. The malfunction mode sorter 3b can determine other types of abnormality including "interference between components", "abnormality of a machine part", "lack of grease", "abnormality of iron powder concentration", "abnormality of a rotating mechanism (motor)", "abnormality of a component other than a rotating mechanism (motor) or a speed reducer", and "grease addition and confirmation of effect", in addition to the "leakage of grease". The term "interference between components" indicates a state in which components come into contact with each other, which should not be caused in a normal state. A collision between components is also included in the interference.

Returning to FIG. 1B, the type of the abnormality (ST2) determined is displayed on the output unit 4 as a malfunction display alarm 4b. The user (maintainer) executes the predetermined maintenance work on the operating robot on the basis of the determination result displayed on the output unit 4, and makes the own decision of whether the determination result made by the abnormality determination unit 3 is correct. The user then provides feedback regarding the result of the maintenance work to the abnormality determination device. The user inputs the true-or-false information of whether the determination result is correct via the operation unit 5. The update unit 6 updates the determination algorithm stored in the memory 2 in accordance with the true-or-false information received by the operation unit 5.

For example, the update unit 6 can update the parameters or the data such as the "reference signal" and the "predetermined threshold" included in the detection algorithm 7a. Alternatively, the update unit 6 may update the detection algorithm 7a itself. The update unit 6 may also update the data included in the sorting rule 7b (FIG. 21). In particular, the update unit 6 may change the combination of the change in the oscillations with time and the change in the disturbance torque with time itself. Alternatively, the update unit 6 may update a threshold for decision between the "increase" and "no change", or a threshold for decision between "no change" and the "decrease" in FIG. 21.

When the determination result of the true-or-false information made by the abnormality determination unit 3 is wrong, the update unit 6 corrects the determination algorithm (7a, 7b) so as not to repeat the wrong determination. When the determination result of the true-or-false information made by the abnormality determination unit 3 is correct, the update unit 6 builds up the determination algorithm (7a, 7b) so as to repeatedly make the correct determination. This can improve the determination accuracy of the abnormality determination unit 3.

As described above, the update unit 6 can update the determination rule itself included in the determination algorithm 7, and the data such as functions or parameters included in the determination rule, according to the feedback information provided by the user, namely, the true-or false information received by the operation unit 5. The phrase "update of the determination algorithm 7" encompasses the update of the determination rule included in the determination algorithm 7, and the update of the data such as functions or parameters included in the determination algorithm and the determination rule.

An example of an abnormality determination method made by the abnormality determination device illustrated in FIG. 1A is described below with reference to FIG. 2A and FIG. 2B. The following method preliminarily sets a "malfunction mode A", a "malfunction mode B", and a "malfunction mode C" as the "predetermined abnormality". The flowcharts shown in FIG. 2A and FIG. 2B each show a process when the abnormality determination unit 3 determines the "malfunction mode A" (YES in step S05).

Figure 3:
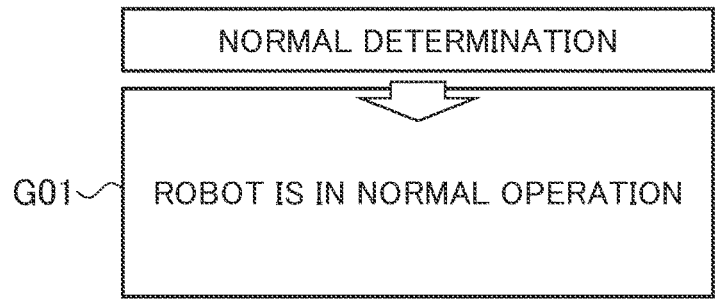
FIG. 3 is a diagram showing an example of screen G01 indicating that an operating robot has no abnormality and is in normal operation.

First, the abnormality determination device acquires the device-condition signal output from the operating robot 200 via the input unit 1 (in step S01), and stores the signal as raw data D01 in the memory 2 (in step S02). The process proceeds to step S03, and the abnormality detector 3a determines the presence or absence of the predetermined abnormality of the operating robot according to the raw data D01 and the detection algorithm 7a. The process returns to step S01 when the determination is made that there is no abnormality (NO in step S03). At this point, the output unit 4 may be caused to display a screen G01 indicating that the operating robot has no abnormality and is in normal operation, as illustrated in FIG. 3. The process proceeds to step S04 when the determination is made that the abnormality is caused (YES in step S03).

In step S04, the malfunction mode sorter 3b determines the type of the abnormality in accordance with the sorting rule 7a and the combination of the "magnitude of oscillations (acceleration)" and the "magnitude of the disturbance torque (drive force)" included in the device-condition signal acquired in step S01. In particular, the malfunction mode sorter 3b determines one of the "malfunction mode A", the "malfunction mode B", the malfunction mode C", and an "unclear malfunction mode" in steps S04 to S06. The term "unclear malfunction mode" refers to a case in which the type of the abnormality is unclear since the abnormality does not belong to any of the malfunction mode A, B, or C.

Figure 4:
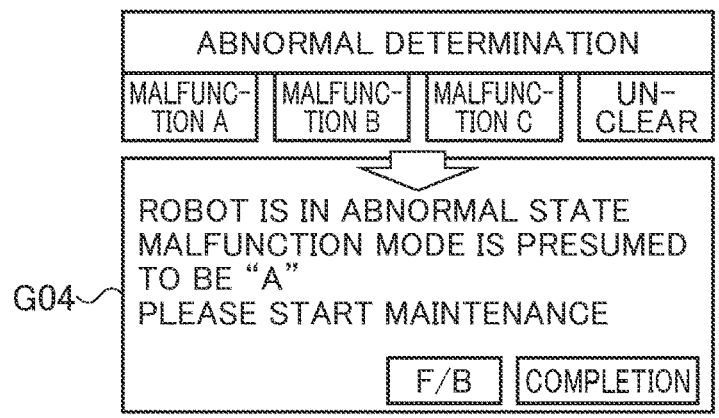
FIG. 4 is a diagram showing an example of screen G04 indicating an occurrence of a malfunction mode A.

When the abnormality is determined to be the "malfunction mode A" (YES in step S04, YES in step S05), the process proceeds to step S08, and the output unit 4 displays the malfunction display alarm 4b. FIG. 4 illustrates an example of a screen G04 indicating the malfunction display alarm 4b. An indication urging the user to execute the maintenance work may be added to a part of the malfunction display alarm 4b.

When the abnormality is determined to be the "malfunction mode B" (YES in step S04, NO in step S05, YES in step S06), the process proceeds to step S09. When the abnormality is determined to be the "malfunction mode C" (YES in step S04, NO in step S05, NO in step S06), the process proceeds to step S10. When the abnormality is determined to be the "unclear malfunction mode" (NO in step S04), the process proceeds to step S07. The output unit 4 displays a screen indicating the occurrence of the "malfunction mode B" or the "malfunction mode C", or a screen indicating the "unclear malfunction mode" as the malfunction display alarm 4b in the same manner as illustrated in FIG. 4 in each of step S09, step S10, and step S07.

The output unit 4 stationarily displays the screen G04 illustrated in FIG. 4 after the abnormality determination result illustrated in FIG. 4 is displayed until the check (the maintenance work) of the operating robot is made by the user. The operation of manually stopping the operating robot is not made upon the maintenance work during the period when the screen G04 is displayed. When a timing of the subsequent abnormality determination (in steps S03, S04) arrives, the abnormality determination result is displayed while overlapping with the precious screen (G01, G04) as illustrated in FIG. 3 or FIG. 4.

The user (maintainer) executes the predetermined maintenance work on the operating robot, and inputs the true-or-false information of whether the determination result made by the abnormality determination unit 3 is correct via the operation unit 5. As illustrated in FIG. 4, the output unit 4 simultaneously displays, on the display screen, the determination result indicating the occurrence of the malfunction mode A and an image for receiving the input of the presence or absence of the maintenance work to be made for the predetermined abnormality included in the determination result. A process of the input to the operation unit 5 and an example of the update made by the update unit 6 are described below.

In step S11, the output unit 4 displays a "completion" button and a "F/B" button as part of the screen G04 of the malfunction display alarm 4b, as illustrated in FIG. 4. The "completion" refers to "correct determination information" indicating that the determination result made by the abnormality determination unit 3 (the malfunction mode A) is correct. The "F/B (feedback)" refers to "wrong determination information" indicating that the determination result made by the abnormality determination unit 3 is wrong.

Figure 12:
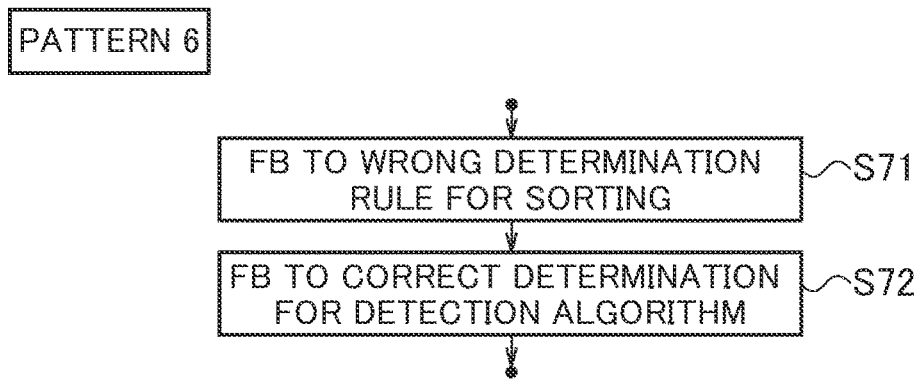
FIG. 12 is a diagram of a feedback process as "Pattern 6" shown in FIG. 2A and FIG. 2B.

When the "completion" button is pressed (YES in step S12), the process proceeds to step S13, and the abnormality determination device determines that the correct determination information is input via the operation unit 5, so as to execute a feedback process as "Pattern 6" shown in FIG. 12. The process then returns to step S01, and the abnormality determination device keeps monitoring whether the operating robot is in normal operation.

Figure 5:
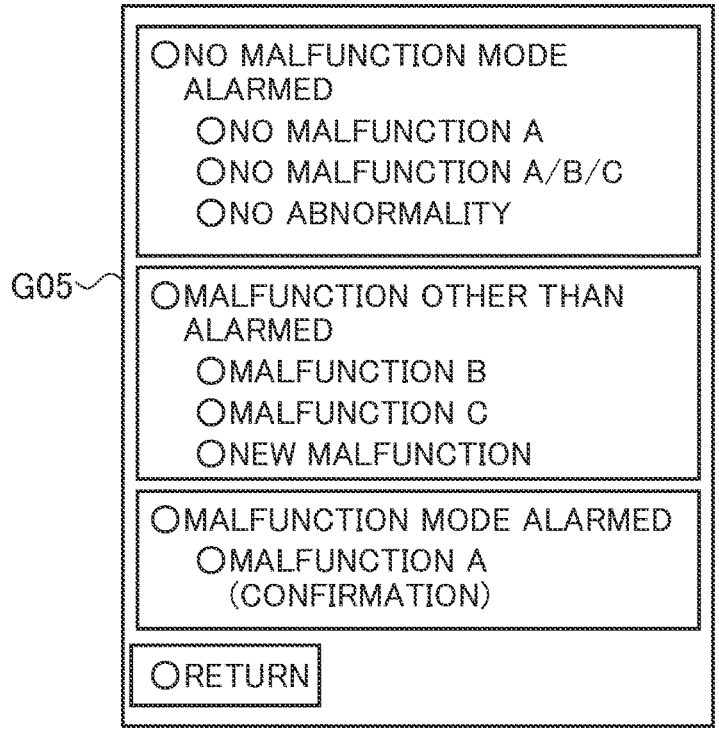
FIG. 5 is a diagram showing an example of screen G05 for choosing true-or-false information of whether a determination result is correct.

When the "completion" button is not pressed (NO in step S12), the process proceeds to step S14 to determine whether the "F/B" button is pressed. The "F/B" button is pressed, instead of the "completion" button, in the case in which "a state different from the determination result has been caused" (YES in step S14). The output unit 4 then displays a screen G05 as illustrated in FIG. 5 (in step S16). The abnormality determination device when displaying the screen G05 provides the feedback of the true-or-false information of whether the determination result is correct to the detection algorithm 7a and the sorting rule 7b, the feedback being classified into the following three cases:

(1) Button: No occurrence of malfunction mode alarmed;
(2) Button: Occurrence of another abnormality other than malfunction mode alarmed; and
(3) Button: Occurrence of malfunction mode alarmed (determination is correct).

When a request for correction is made for the wrong determination result, (1) button or (2) button is chosen. When a request for confirmation is made for the correct determination result, (3) button is chosen. When (1) button is pressed (YES in step S17), the process proceeds to step S18. As illustrated in FIG. 5, any of the following cases as alternatives can be chosen:

(1-1) Button: "No malfunction mode A";
(1-2) Button: "No malfunction mode A, B, or C"; or
(1-3) Button: "No abnormality".

Figure 10:
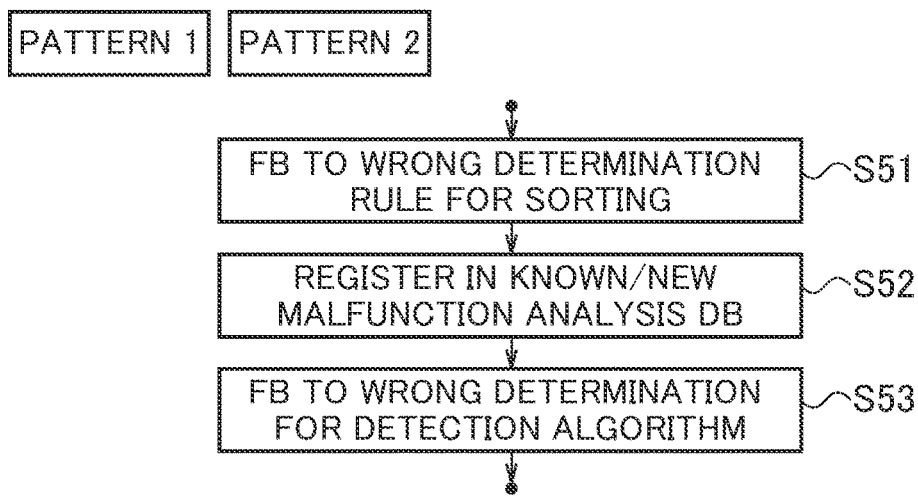
FIG. 10 is a diagram of a feedback process as "Pattern 1" and "Pattern 2" shown in FIG. 2A and FIG. 2B.

When (1-1) button is pressed (YES in step S18), the device-condition signal regarding the determination result is stored in the memory 2 (a second memory) (in step S19). In step S20, a feedback process as "Pattern 1" shown in FIG. 10 is executed.

When (1-2) button is pressed (YES in step S33), the device-condition signal regarding the determination result is stored in the memory 2 (the second memory) (in step S34). In step S35, a feedback process as "Pattern 2" shown in FIG. 10 is executed.

Figure 13:
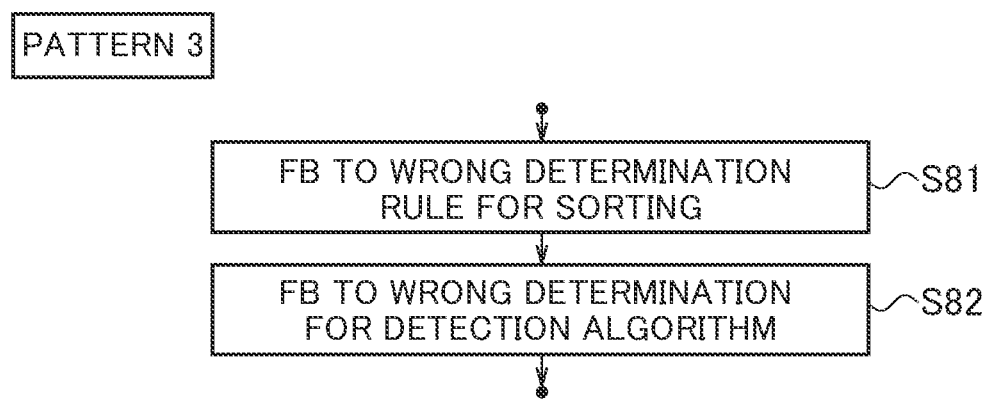
FIG. 13 is a diagram of a feedback process as "Pattern 3" shown in FIG. 2A and FIG. 2B.

When (1-3) button is pressed (NO in step S33: in step S37), a feedback process as "Pattern 3" shown in FIG. 13 is executed in step S38.

In step S17, when not (1) button but (2) button or (3) button is pressed (NO in step S17), the process proceeds to step S22. When button (2) is pressed, any of the following cases as alternatives can be chosen, as illustrated in FIG. 5:

(2-1) Button: "Malfunction mode B";
(2-2) Button: "Malfunction mode C"; or
(2-3) Button: "New malfunction mode".

When (3) button is pressed (YES in step S32), the process returns to step S13 as in the case of the "completion" button is pressed (YES in step S12), since the correct determination information has been input.

Figure 11:
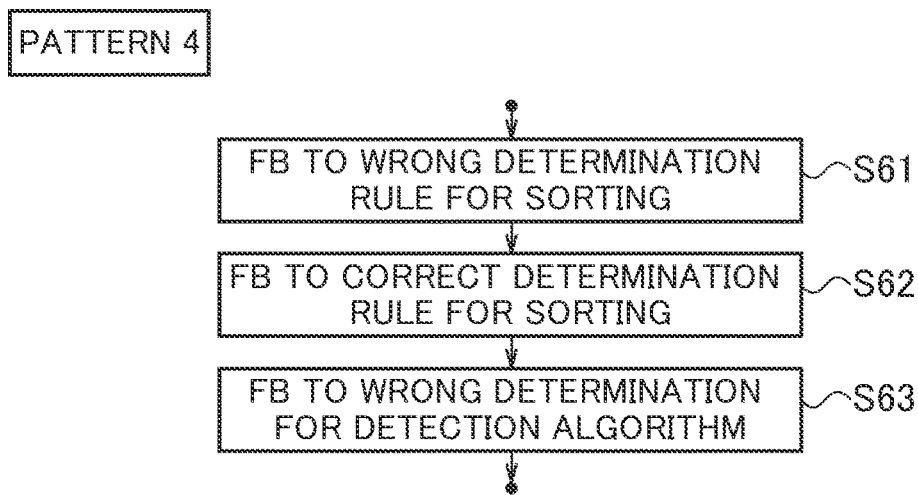
FIG. 11 is a diagram of a feedback process as "Pattern 4" shown in FIG. 2A and FIG. 2B.

When (2-1) button is pressed (YES in step S22) the process proceeds to step S23, and a feedback process as "Pattern 4" shown in FIG. 11 is executed. When (2-2) button is pressed (YES in step S25) the process proceeds to step S26, and the feedback process as "Pattern 4" shown in FIG.

Figure 14:
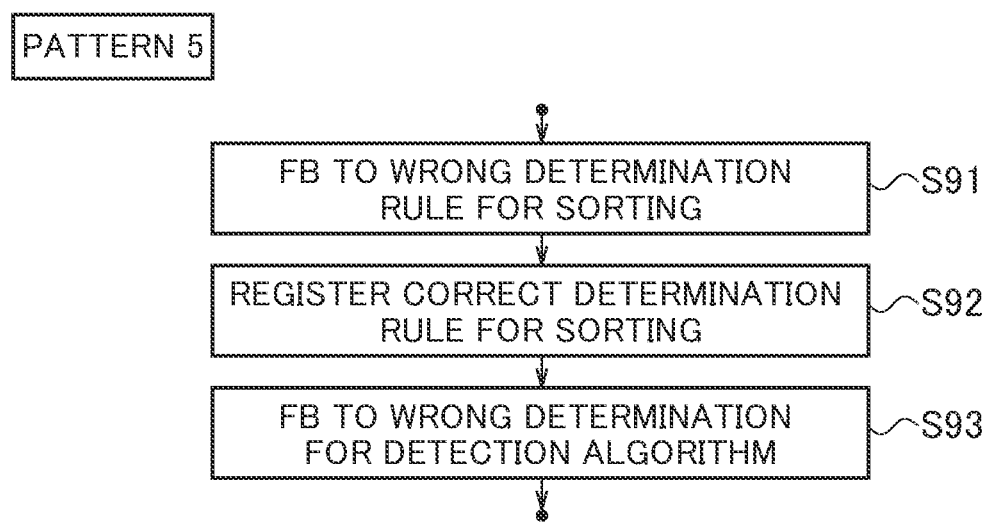
FIG. 14 is a diagram of a feedback process as "Pattern 5" shown in FIG. 2A and FIG. 2B.

11 is executed. When (2-3) button is pressed (YES in step S28), the device-condition signal regarding the determination result is stored in the memory 2 (the second memory) (in step S29). The process proceeds to step S30, and a feedback process as "Pattern 5" shown in FIG. 14 is executed.

The operation of any of (1-1) button, (1-2) button, or (2-3) button (YES in step S18, YES in step S33, YES in step S28) indicates that the information indicating that the type of the abnormality is unclear is input as the true-or-false information. In this case, the device-condition signal corresponding to the determination result is temporarily stored in the memory 2 (the second memory). The monitoring of the management condition of the operating robot is then restarted at a later date, and the maintenance work is executed after the operation of the operating robot is finished, so as to analyze a phenomenon of the abnormality. This can provide the feedback of the true-or-false information based on the re-analysis to the abnormality determination unit 3.

Next, the update of the determination algorithm made by the update unit 6 is described below. The update unit 6 updates the determination algorithm in accordance with the input of the true-or-false information made in response to the determination result by the user. FIG. 10 is the feedback process executed as "Pattern 1" and "Pattern 2" shown in FIG. 2A and FIG. 2B. When (1-1) button or (1-2) button is pressed, the information indicating that the abnormality is not the malfunction mode A is input through the operation unit 5. The update unit 6 then corrects the detection algorithm 7a (in step S53) and corrects the sorting rule 7b (in step S51) so as not to repeatedly make a wrong determination that the abnormality is the malfunction mode A when the same device-condition signal is input again.

As described above, the pressing of (1-1) button or (1-2) button means that the true-or-false information indicating that the type of the abnormality is unclear is input. The update unit 6 thus can build up a passive determination algorithm which determines no occurrence of the malfunction mode B in the operating robot, and a passive determination algorithm which determines no occurrence of the malfunction mode C in the operating robot, in accordance with the corresponding true-or-false information. The "determination algorithm" includes at least either the passive determination algorithm which determines that the operating robot does not have the predetermined abnormality (the prescribed malfunction mode) or a positive determination abnormality which determines that the operating robot has the predetermined abnormality (the prescribed malfunction mode).

Figure 1B:
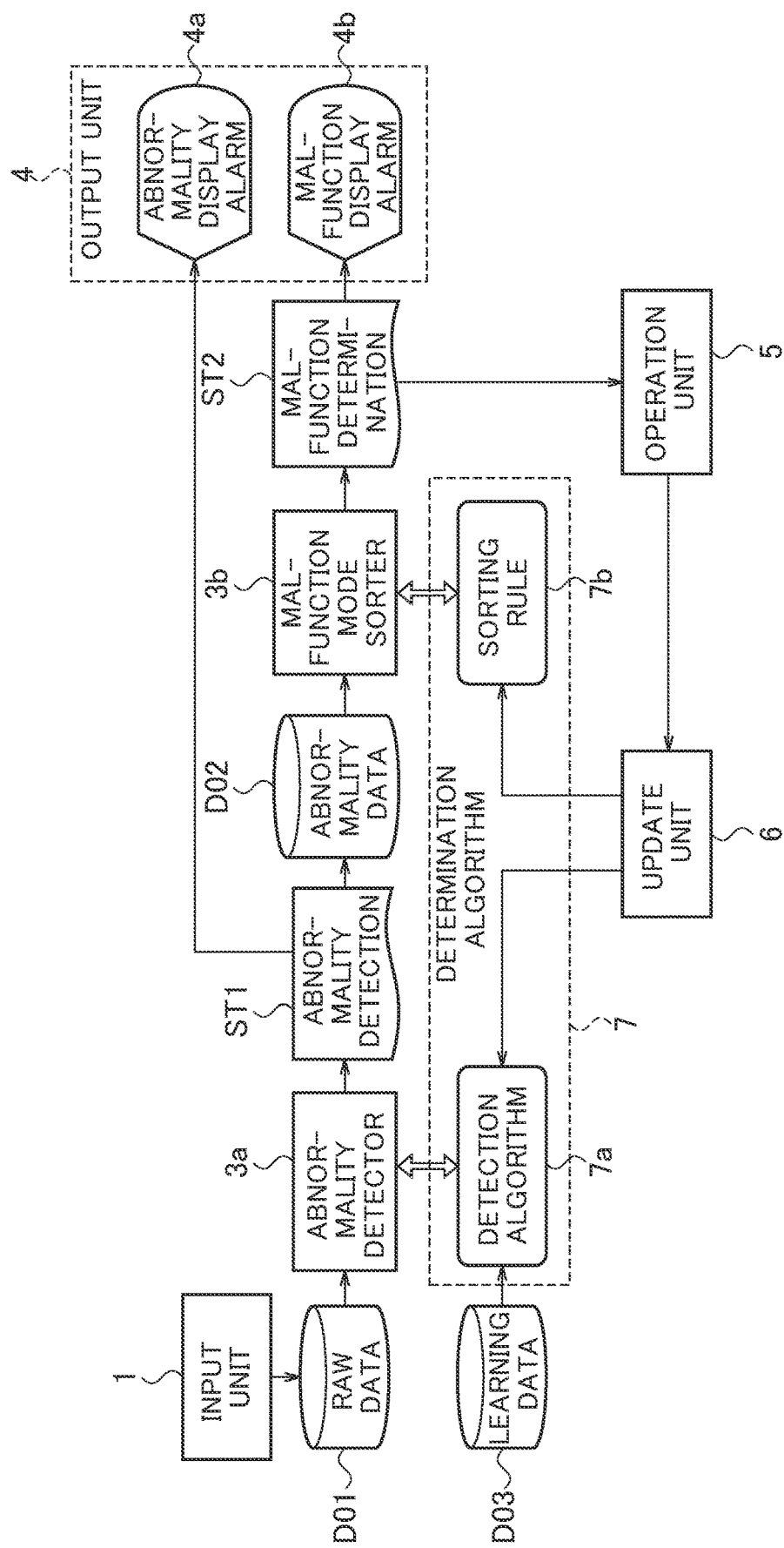
FIG. 1B is a diagram of a data process showing a process of processing data by the abnormality determination device illustrated in FIG. 1A.

The update unit 6 stores the device-condition signal regarding the determination result in the memory 2 as leaning data D03 shown in FIG. 1B (in step S52). When (1-1) button is pressed, a screen G17 as illustrated in FIG. 6A is displayed on the output unit 4. When (1-2) button is pressed, a screen G18 as illustrated in FIG. 6B is displayed on the output unit 4. These indications can allow the user to recognize that the determination algorithm has been updated in accordance with the true-or-false information received by the operation unit 5.

The "correction of the determination algorithm (7a, 7b)" made when the determination of the malfunction mode A is wrong means that the characteristics of the device-condition signal obtained this time are removed from the determination algorithm (7a, 7b) that determines the occurrence of the malfunction mode A. For example, a threshold of a characteristic amount regarding the malfunction mode A may be corrected so as not to determine that the abnormality is caused upon detecting the occurrence of the abnormality. The same operation is also applied to the case of the malfunction modes B and C. The process of updating illustrated in FIG. 10 does not limit the order of execution from steps S51 to S53.

Figure 2B:
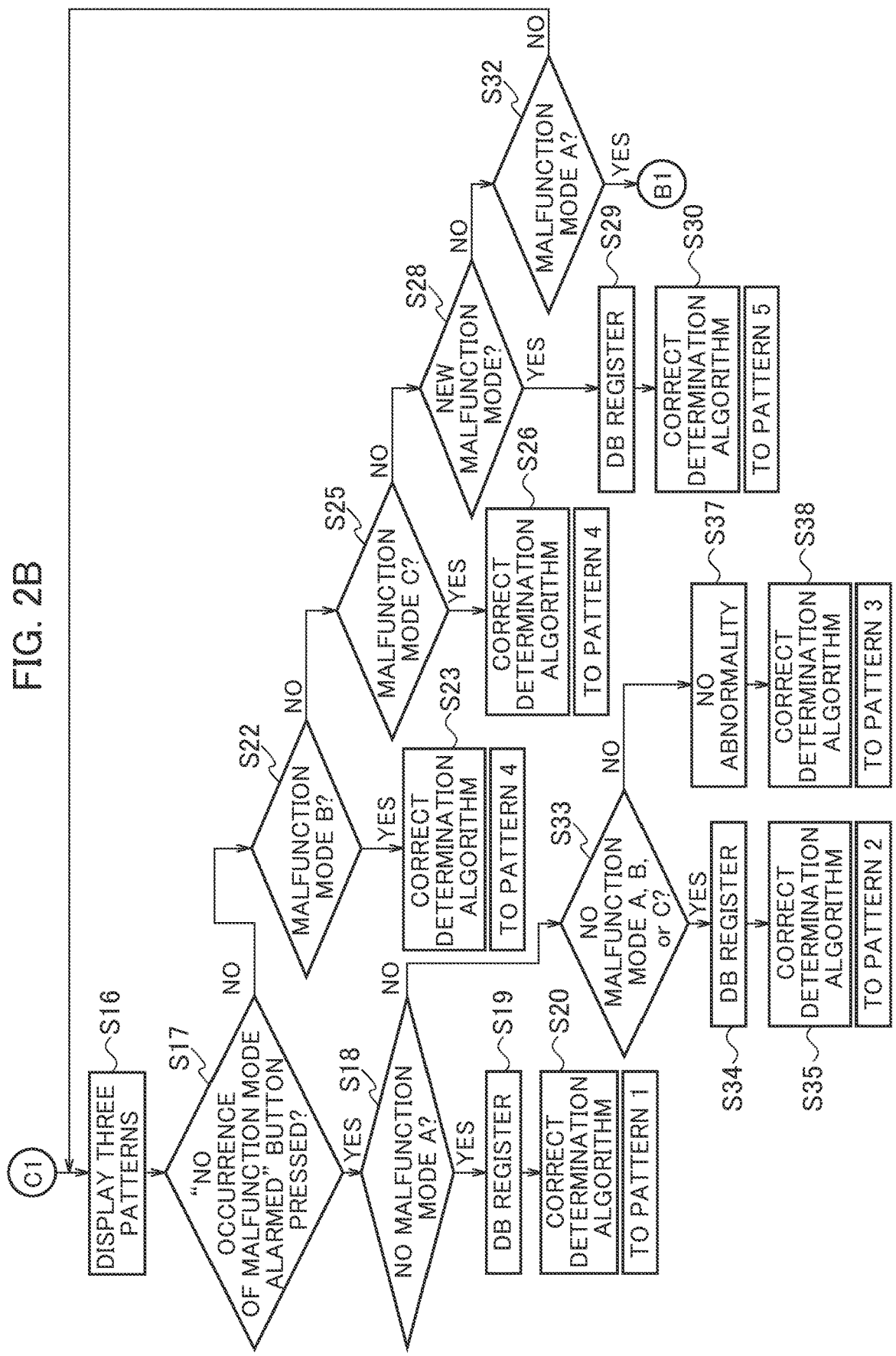
FIG. 2B is a flowchart showing an example of operation of the abnormality determination device illustrated in FIG. 1A (Part 2).

FIG. 13 is a feedback process as "Pattern 3" shown in FIG. 2A and FIG. 2B. When (1-3) button is pressed (NO in step S33), the sorting rule 7b is corrected (in step S81) so as not to repeat the wrong determination determining the occurrence of the malfunction mode A since the abnormality is not the malfunction mode A. The fact has been confirmed through the execution of the maintenance work that there is no abnormality and the operating robot is in normal operation. The detection algorithm 7a is thus corrected (in step S82) so as not to repeat the wrong determination determining the occurrence of the abnormality. Although not illustrated, the update unit 6 may also build up the passive determination algorithm which determines that the abnormality caused in the operating robot is not the malfunction mode B and the passive determination algorithm which determines that the abnormality caused in the operating robot is not the malfunction mode C.

As described above, when (1) button (no occurrence of the malfunction mode alarmed) is operated, the notification to the update unit 6 notifying that the determination is wrong or any other malfunction is not caused can be available. The correction request for the wrong determination through the operation of (1) button can be an alternative for denying the current sorting rule 7b. The process of updating illustrated in FIG. 13 does not limit the order of execution from steps S81 to S83.

Figure 7:
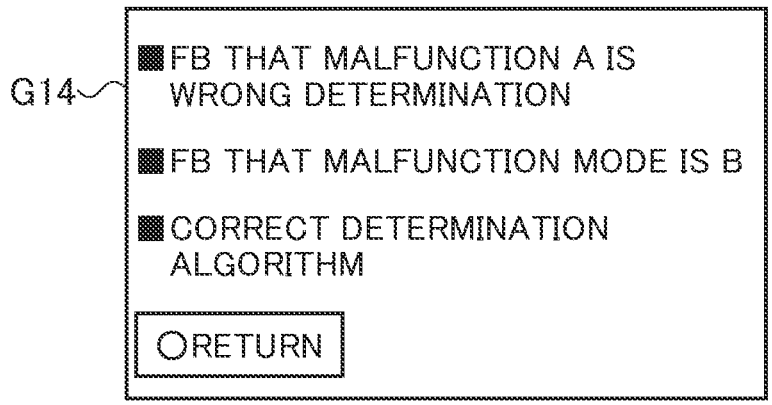
FIG. 7 is a diagram showing an example of screen G14 displayed on the output unit 4 when (2-1) button is pressed.

FIG. 11 is the feedback process as "Pattern 4" shown in FIG. 2A and FIG. 2B. When (2-1) button is pressed (YES in step S22), the detection algorithm 7a is corrected (in step S63) and the sorting rule 7b is corrected (in step S61) so as not to repeat the wrong determination determining the occurrence of the malfunction mode A since the abnormality is not the malfunction mode A. In addition, the positive determination algorithm (the sorting rule 7b) determining the occurrence of the malfunction mode B is built up (in step S62) since the abnormality is the malfunction mode B, and the positive determination algorithm (the sorting rule 7b) determining the occurrence of the malfunction mode A in the operating robot is corrected (in step S61). When (2-1) button is pressed, a screen G14 illustrated in FIG. 7 is displayed on the output unit 4.

Figure 8:
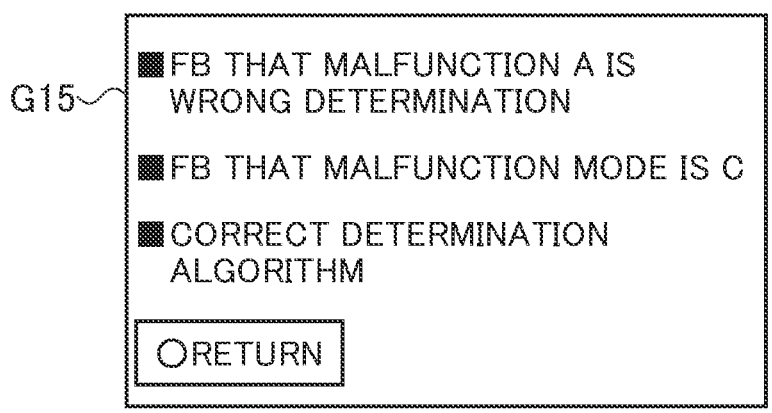
FIG. 8 is a diagram showing an example of screen G15 displayed on the output unit 4 when (2-2) button is pressed.

When (2-2) button is pressed (YES in step S25), the detection algorithm 7a is corrected (in step S63) and the sorting rule 7b is corrected (in step S61) so as not to repeat the wrong determination determining the occurrence of the malfunction mode A since the abnormality is not the malfunction mode A. In addition, the positive determination algorithm (the sorting rule 7b) determining the occurrence of the malfunction mode C is built up (in step S62) since the abnormality is the malfunction mode C, and the positive determination algorithm (the sorting rule 7b) determining the occurrence of the malfunction mode A in the operating robot is corrected (in step S61). When (2-2) button is pressed, a screen G15 illustrated in FIG. 8 is displayed on the output unit 4. The process of updating illustrated in FIG. 11 does not limit the order of execution from steps S61 to S63.

Figure 9:
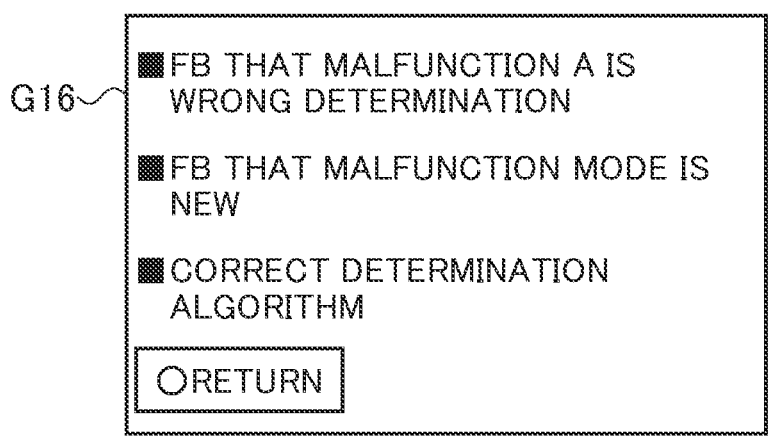
FIG. 9 is a diagram showing an example of screen G16 displayed on the output unit 4 when (2-3) button is pressed.

FIG. 14 is the feedback process as "Pattern 5" shown in FIG. 2A and FIG. 2B. When (2-3) button is pressed (YES in step S28), the information indicating that the abnormality is a new malfunction mode instead of the prescribed malfunction mode A, B, or C. The "new malfunction mode" is a malfunction mode additionally confirmed during the maintenance work made by the user. The update unit 6 updates the determination algorithm (7a, 7b) in accordance with the true-or-false information indicating that the new malfunction mode has been confirmed. In particular, the update unit 6 additionally sets the sorting rule 7b for sorting the new malfunction mode (hereinafter referred to as a "malfunction mode D"). The malfunction mode sorter 3b can determine the type of the abnormality based on the new sorting rule 7b in which the malfunction mode D is added to the prescribed malfunction modes A, B, and C. When (2-3) button is pressed, a screen G16 illustrated in FIG. 9 is displayed on the output unit 4.

When (2-3) button is pressed (YES in step S28), the detection algorithm 7a is corrected (in step S93) and the sorting rule 7b is corrected (in step S91) so as not to repeat the wrong determination determining the occurrence of the malfunction mode A since the abnormality is not the malfunction mode A. In addition, the update unit 6 can build up the passive determination algorithm which determines that the abnormality caused in the operating robot is not the malfunction mode B, and the passive determination algorithm which determines that the abnormality caused in the operating robot is not the malfunction mode C (in step S92). The process of updating illustrated in FIG. 14 does not limit the order of execution from steps S91 to S93.

The "correction of the determination algorithm" made when (2-1) button or (2-2) button is pressed means the change from the sorting rule determining that the abnormality is the malfunction mode A to the sorting rule determining that the abnormality is the malfunction mode B or C. The "correction of the determination algorithm" made when (2-3) button is pressed means the change from the sorting rule determining that the abnormality is the malfunction mode A to the sorting rule determining that the abnormality is the new malfunction mode D. For example, the threshold of the characteristic amount derived from the malfunction mode A is reset so as not to detect the malfunction derived from the malfunction mode A upon the detection of the abnormality (in step S03). In addition, the threshold of the characteristic amount derived from the malfunction mode B or C or the new malfunction mode D is reset so as to detect the malfunction derived from the malfunction mode B, C, or D. The correction request for the wrong determination is an alternative for correcting the determination of the malfunction mode to the other malfunction mode.

FIG. 12 is the feedback process as "Pattern 6" shown in FIG. 2A and FIG. 2B. When the "completion" button is pressed (YES in step S12) or (3) button is pressed (YES in step S32), the feedback of "Pattern 6" is executed. The pressing of the "completion" button or (3) button means that the operation unit 5 receives the correct determination information, as the true-or-false information", indicating that the determination result made by the abnormality determination unit 3 is correct. The update unit 6 builds up the detection algorithm 7a (in step S72) and builds up the sorting rule 7b (in step S71) so as to repeatedly make the correct determination based on the correct determination information. The process of updating illustrated in FIG. 12 does not limit the order of execution from steps S71 to S73.

The timing of updating the determination algorithm (7a, 7b) according to the feedback processes illustrated in FIG. 10 to FIG. 14 is described below. When the input of the presence or absence of the maintenance work is made via the operation unit 5, the update unit 6 updates the determination algorithm 7. The timing of updating the determination algorithm (7a, 7b) is preferably as early as possible after the input of the presence or absence of the maintenance work is made. The unit of the timing is not second and minute but hour and date when a certain amount of input data is required to be accumulated for the completion of the maintenance work. The feedback information for updating thus may be integrated so as to execute the update taking dates, weeks, or months.

First Modified Example

In a first modified example, when the correct determination information indicating that the determination result is correct is input via the operation unit 5, the update unit 6 provides the feedback of the corresponding determination result to at least either the detection algorithm 7a or the sorting rule 7b.

Figure 16:
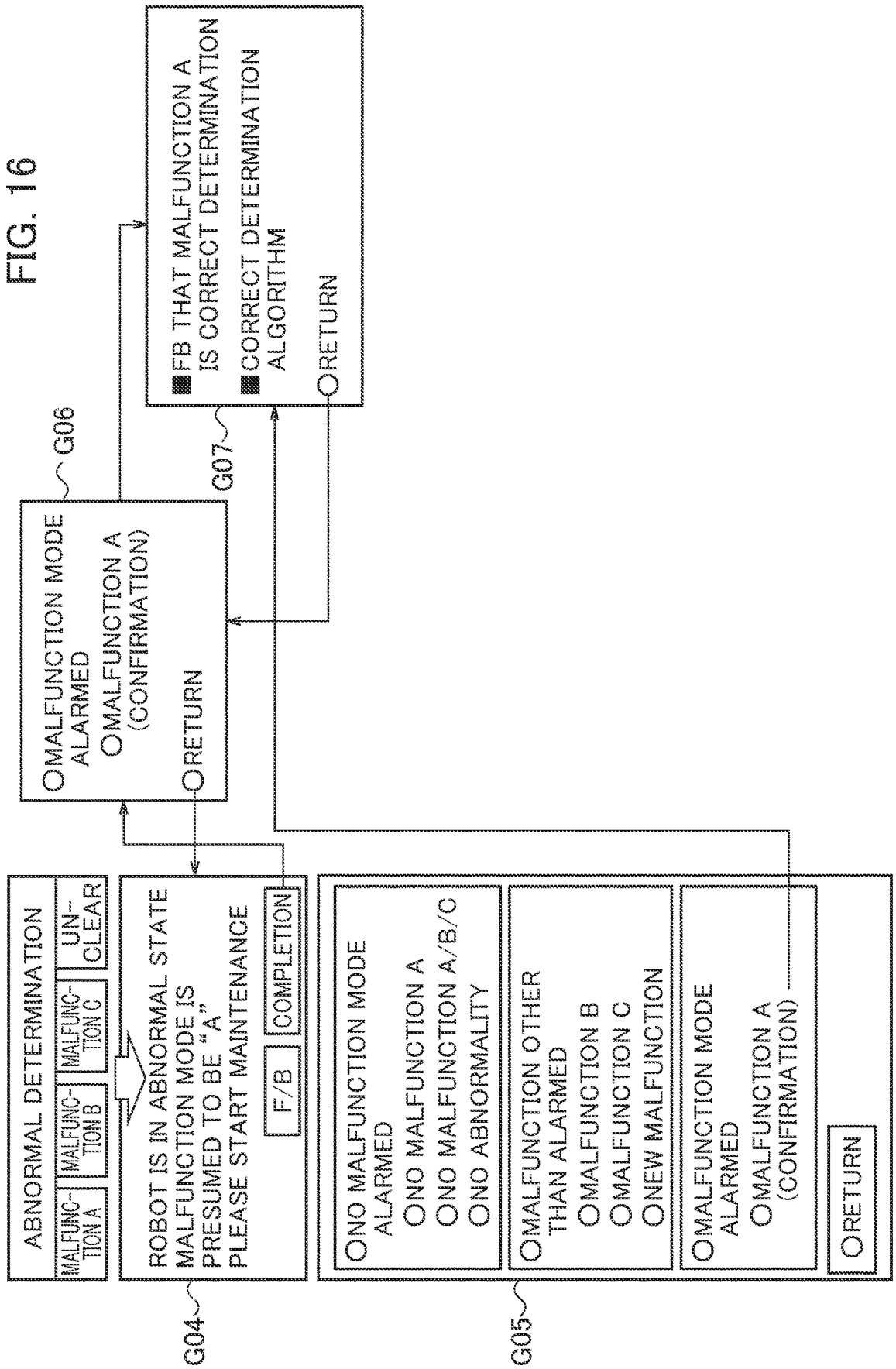
FIG. 16 is a diagram of a displaying process regarding screens (G04 to G07) displayed when correct determination information indicating an occurrence of a malfunction mode A is input (YES in step S12, YES in step S32) according to the first modified example.

For example, when the correct determination information indicating that the abnormality is the malfunction mode A is input (YES in step S12, YES in step S32) in FIG. 2A and FIG. 2B, the confirmation that the abnormality is the malfunction mode A is made (screen G06) so as to notify the feedback of the correct determination information to be provided to the determination algorithm 7 (screen G07), as illustrated in FIG. 16. Namely, the output unit 4 displays the screens (G04 to G07) illustrated in FIG. 16, instead of the screens G04 and G05 illustrated in FIG. 4 and FIG. 5 described in the above embodiment.

Figure 15:
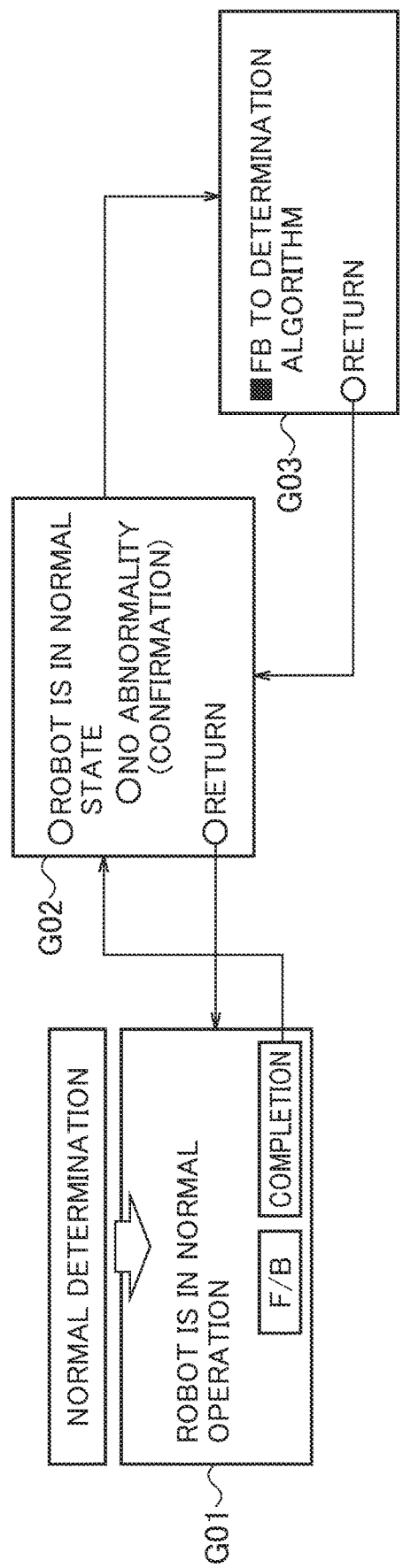
FIG. 15 is a diagram of a displaying process regarding screens (G01 to G03) displayed when step S03 shown in FIG. 2A is determined to be NO according to a first modified example.

When the step S03 shown in FIG. 2A is determined to be NO, the "completion" button and the "F/B" button for urging the user to execute the maintenance work (confirmation work) in response to the determination result are added to the screen G01 indicating that the operating robot has no abnormality and is in normal operation. The screen G02 for receiving the correct determination information indicating that there is no abnormality is then displayed so as to notify the feedback to be provided to the determination algorithm 7 (the screen G03). Namely, the output unit 4 displays the screens (G01 to G03) illustrated in FIG. 15, instead of the screen G01 illustrated in FIG. 3 described in the above embodiment.

When the correct determination information is input, providing the feedback of the correct determination information to the detection algorithm 7a and the sorting rule 7b can build up the decision reference upon the determination made by the abnormality determination unit 3 such as deep learning using a neural network, for example.

Second Modified Example

A second modified example is presumed to execute regular maintenance work, which is different from the processing process illustrated in FIG. 2A and FIG. 2B for executing the maintenance work upon the occurrence of the abnormality in the operating robot. In particular, the abnormality determination device is activated when the condition of the operating robot is checked as maintenance work regardless of the confirmation of no occurrence of abnormality before the maintenance work. This can update the determination algorithm 7 according to the malfunction mode found during the maintenance work and the normal operation confirmed during the maintenance work.

The user (maintainer) regularly executes the maintenance work on the operating robot. When any malfunction is detected during the maintenance work, the abnormality determination device is activated so as to provide the feedback of the true-or-false information to the determination algorithm 7. In other words, the user makes a correction request to the update unit 6 not in response to the detection of the abnormality by the abnormality determination unit 3 (YES in step S03) as a trigger but in response to finding of the abnormality upon the regular maintenance work as a trigger. In this case, the screens G01 and G09 to G13 illustrated in FIG. 17 are displayed, instead of the screen G01 illustrated in FIG. 3.

Figure 17:
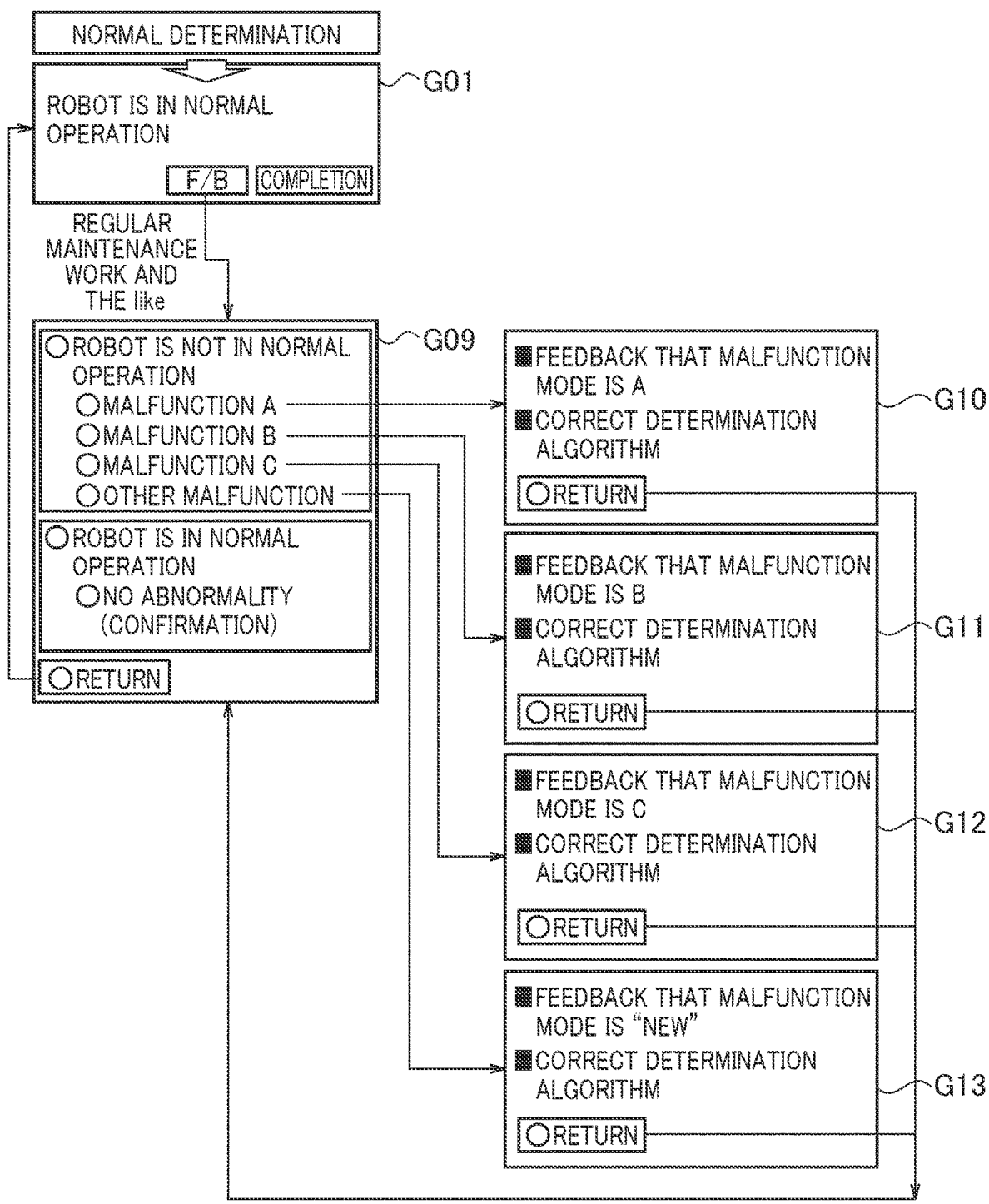
FIG. 17 is a diagram of a displaying process regarding screens (G01, G09 to G13) according to a second modified example.

The pressing of the "F/B" button leads to the display of the screen G09 illustrated in FIG. 17. When the screen G09 is displayed, the feedback of the result of the maintenance work is provided to the detection algorithm 7a and the sorting rule 7b, the feedback being classified into the following cases (4) and (5):

(4) Button: Operating robot is not in normal operation; and (5) Button: Operating robot is in normal operation.

When the correction request is made for the wrong determination result (not in normal operation), (4) button is chosen. When the confirmation request is made for the correct determination result (in normal operation), (5) button is chosen.

The "update of the determination algorithm (7a, 7b)" when (4) button is chosen is to provide the feedback of notifying that "there is abnormality" against the determination of no malfunction (in normal operation). The update unit 6 then corrects at least either the positive determination algorithm determining that there is abnormality and the passive determination algorithm determining that there is no abnormality included in the detection algorithm 7a so as not to repeatedly make a wrong determination that there is no abnormality. When (4) button is chosen, any of the following cases as alternatives can be chosen:

(4-1) Button: Malfunction mode A;
(4-2) Button: Malfunction mode B;
(4-3) Button: Malfunction mode C; and
(4-4) Button: Another malfunction mode.

When (4-1) button is chosen, the update unit 6 can correct the sorting rule (screen G10) determining that the abnormality is the malfunction mode A. When (4-2) button is chosen, the update unit 6 can correct the sorting rule (screen G11) determining that the abnormality is the malfunction mode B. When (4-3) button is chosen, the update unit 6 can correct the sorting rule (screen G12) determining that the abnormality is the malfunction mode C. The specific correcting method for the sorting rule is the same as that described in the above embodiment, and overlapping explanations are not repeated below. When (4-4) button is chosen, the update unit 6 can add the sorting rule (screen G13) determining that the abnormality is the new malfunction mode D to the sorting rule 7b.

The "update of the determination algorithm (7a, 7b)" when (5) button is chosen is to provide the feedback of notifying that "there is no abnormality" in response to the determination of no malfunction (in normal operation). The update unit 6 then builds up at least either the positive determination algorithm determining that there is an abnormality and the passive determination algorithm determining that there is no abnormality in the detection algorithm 7a so as to repeatedly make a correct determination that there is no abnormality.

Figure 18:
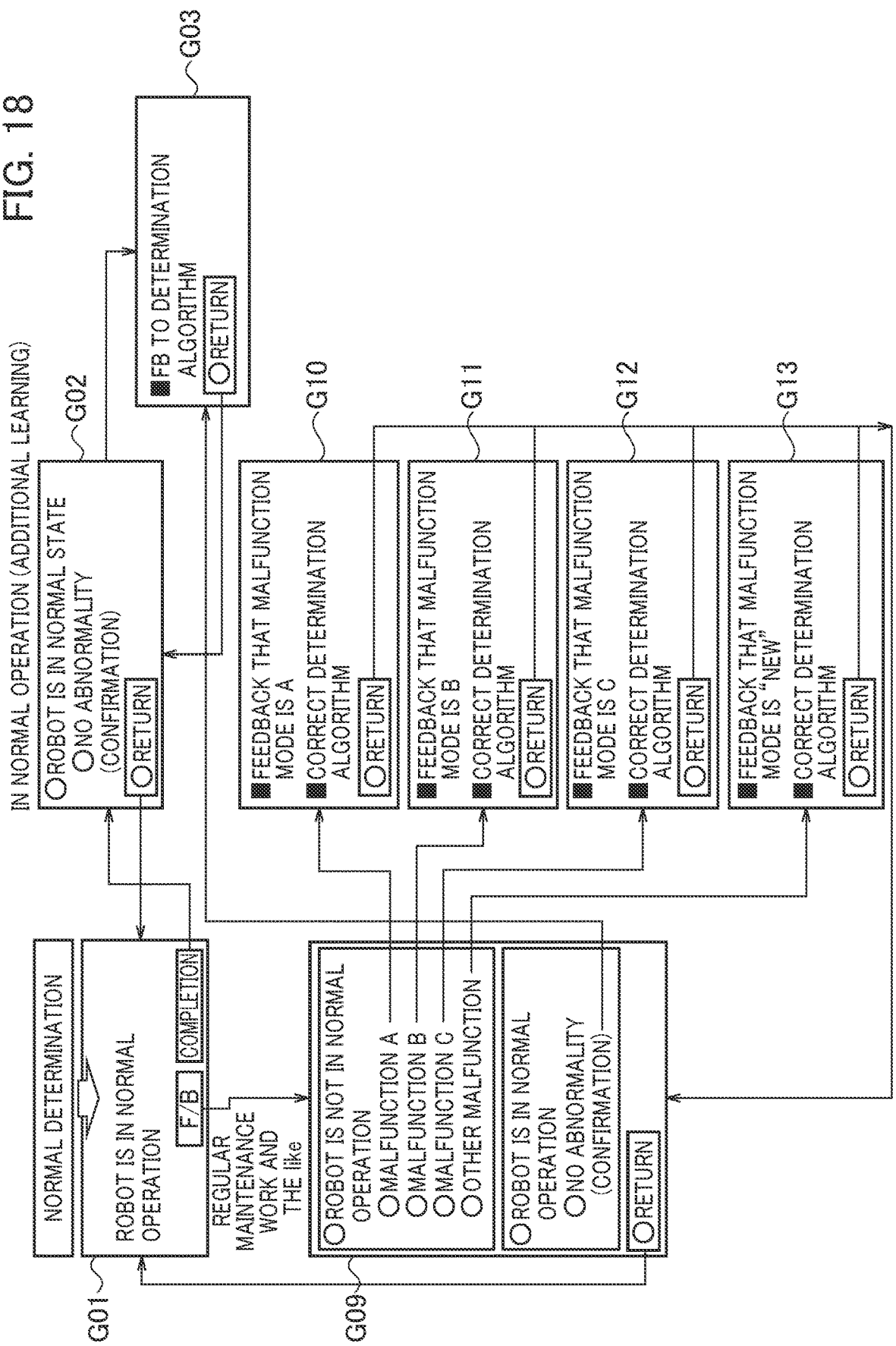
FIG. 18 is a diagram showing one example in which the displaying process regarding the screens G01 to G03 shown in FIG. 15 and the displaying process regarding the screens G01 and G09 to G13 shown in FIG. 17 are combined when a correct determination is made.

The embodiment, the first modified example, and the second modified example can be implemented in combination as appropriate. For example, as illustrated in FIG. 18 (in the correct determination), a displaying process indicated by the screens G01 to G03 illustrated in FIG. 15 may be combined and executed together with a displaying process indicated by the screens G01 and G09 to G13 illustrated in FIG. 17.

Figure 19:
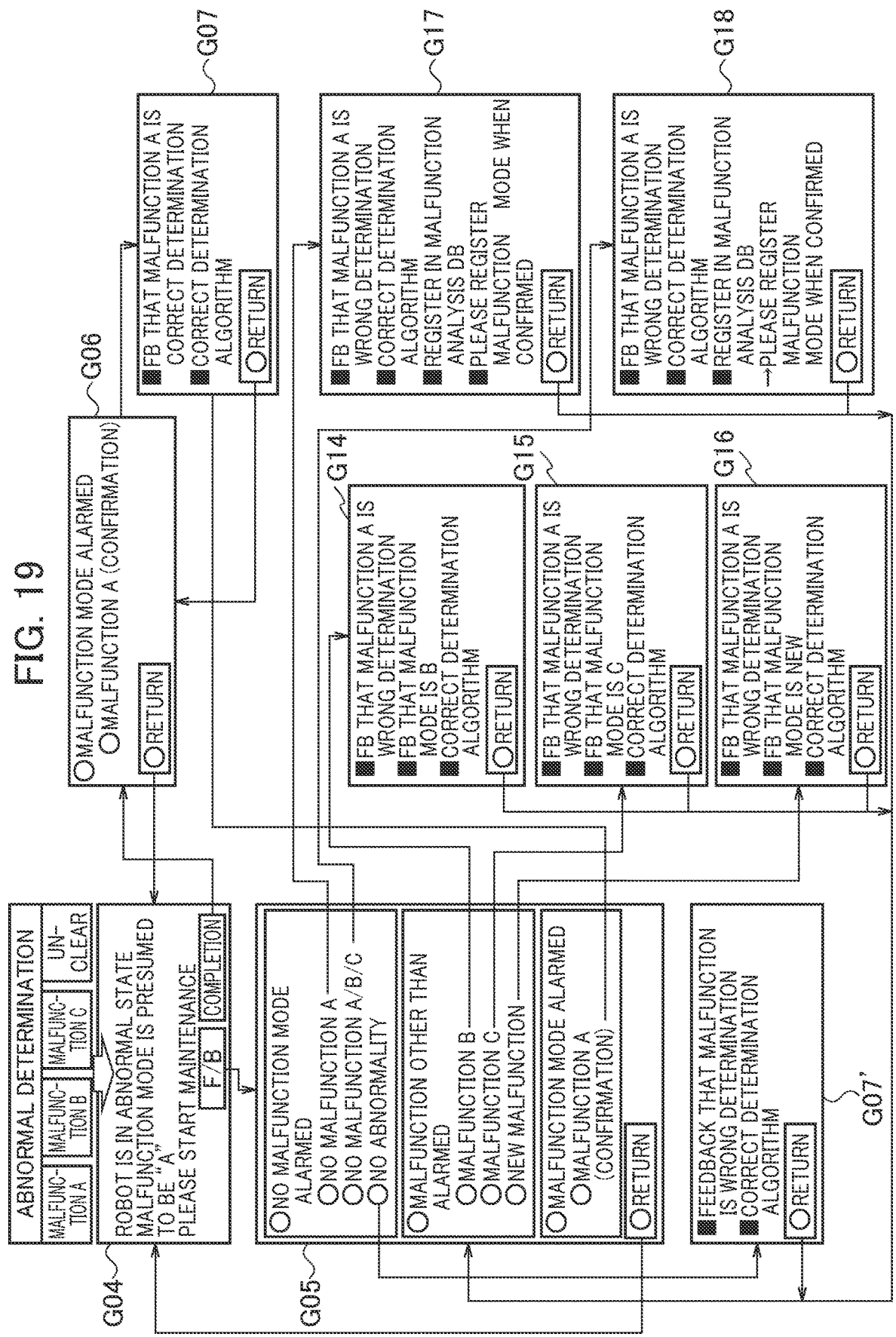
FIG. 19 is a diagram showing one example in which the displaying process regarding the screens G04 to G07 and GOT shown in FIG. 16 and the displaying process regarding the screens G04, G05, and G14 to G18 (FIG. 4 to FIG. 9) corresponding to the processing process shown in FIG. 2A and FIG. 2B are combined when an abnormal determination is made.

As illustrated in FIG. 19 (in the abnormal determination), a displaying process indicated by the screens G04 to G07 and G07' illustrated in FIG. 16 may be combined and executed together with a displaying process indicated by the screens G04, G05, and G14 to G18 (FIG. 4 to FIG. 9) corresponding to the processing process illustrated in FIG. 2A and FIG. 2B.

As described above, the embodiment and the modified examples can achieve the following functional effects.

The abnormality determination device includes the abnormality determination unit 3 that determines the predetermined abnormality of the operating robot in accordance with the device-condition signal and the determination algorithm 7, the output unit 4 that outputs the determination result regarding the predetermined abnormality made by the abnormality determination unit 3, the operation unit 5 that receives the input of the true-or-false information of whether the determination result is correct from the user, and the update unit 6 that updates the determination algorithm 7 stored in the memory 2 in accordance with the true-or-false information received by the operation unit 5. The abnormality determination device can update the determination algorithm 7 stored in the memory 2 in accordance with the true-or-false information input by the user. The update of the abnormality algorithm 7 can be made with an excessive input load on the user avoided.

As illustrated in FIG. 5, the true-or-false information is any one of the following cases:

(1) Information indicating no occurrence of malfunction mode (one abnormality) alarmed;

(2) Information indicating occurrence of another malfunction mode other than malfunction mode (one abnormality) alarmed; and (3) Information indicating occurrence of malfunction mode (one abnormality) alarmed.

The abnormality determination device can receive the entire true-or-false information with no omission in accordance with the maintenance work made by the user in response to the determination result. The abnormality determination device thus can not only correct the determination algorithm 7 against the wrong determination result but also build up the determination algorithm 7 in response to the correct determination result. Namely, the abnormality determination device can widely update the determination algorithm 7.

As illustrated in FIG. 1B, the determination algorithm 7 includes the detection algorithm 7a (the first determination algorithm) for determining the presence or absence of the predetermined abnormality of the operating robot, and the sorting rule 7b (the second determination algorithm) for determining the type of the abnormality caused in the operating robot. The abnormality determination device thus can not only update the determination model (the second determination algorithm) for sorting the type of the abnormality but also update the determination model (the first determination algorithm) for sorting the normal/abnormal states. The abnormality determination device can improve both the accuracy of detecting the normal/abnormal states and the accuracy of distinguishing the abnormality.

The output unit 4 including the display screen displays the image indicating the determination result and the image for receiving the input of the true-or-false information simultaneously on the display screen, as illustrated in FIG. 4. The output unit 4 outputs the true-or-false information input in accordance with the determination result and the maintenance work on the same screen. The abnormality determination device thus can effectively execute the process of creating the data for updating the determination algorithm 7. In addition, the user can input the information regarding the true or false determination while visually avoiding errors.

The image that receives the input of the true-or-false information includes a plurality of selectable optional items created according to the determination result. The update unit 6 updates the determination algorithm 7 in accordance with the true-or-false information included in the optional item selected by the operation unit 5. The input of the true-or-false information is the optional item based on the maintenance work, so as to eliminate a lot of work such as detail description processing and data editing upon the input.

The update unit 6 updates both the detection algorithm 7a (the first determination algorithm) and the sorting rule 7b (the second determination algorithm) in accordance with the true-or-false information included in the optional item selected by the operation unit 5. The abnormality determination device can update not only the determination model (the second determination algorithm) for sorting the type of the abnormality but also update the determination model (the first determination algorithm) for sorting the normal/abnormal states. The abnormality determination device can improve both the accuracy of detecting the normal/abnormal states and the accuracy of distinguishing the abnormality.

The output unit 4 simultaneously displays on the screen G04 both the determination result that the abnormality is the malfunction mode A and an image for receiving the input of the presence or absence of the maintenance work made for the predetermined abnormality included in the determination result, as illustrated in FIG. 4. The output unit 4 outputs the determination result and the information for inputting the presence or absence of the maintenance work simultaneously on the same screen. This can avoid an error upon the maintenance work, and execute the input of the information regarding the true or false determination with a high accuracy.

As illustrated in FIG. 2A and FIG. 2B, the update unit 6 updates the determination algorithm 7 in response to the input of the presence or absence of the maintenance work made for the predetermined abnormality as a trigger. The update of the update unit 6 thus can be made at an appropriate timing.

The operation of (1-1) button, (1-2) button, or (2-3) button indicates that the presence or absence of the abnormality or the type of the abnormality is unclear. The operation unit 5 can receive, as the true-or-false information, the input of at least either the information indicating that the presence or absence of the abnormality is unclear or the information indicating that the type of the abnormality is unclear.

When at least either the information indicating that the presence or absence of the abnormality is unclear or the information indicating that the type of the abnormality is unclear is input, the memory (the second memory) stores the device-condition signal corresponding to the determination result. The memory stores the device-condition signal output from the operating robot which is unclear during the maintenance work made in accordance with the determination result. The abnormality confirmed after the maintenance work thus can be reflected in the determination algorithm 7.

The determination algorithm includes at least either the positive determination algorithm determining that the operating robot has the predetermined abnormality and the passive determination algorithm determining that the operating robot does not have the predetermined abnormality.

The use of at least either the positive determination algorithm or the passive determination algorithm can improve both the accuracy of the determination of the occurrence of abnormality in the abnormal state and the determination of no occurrence of abnormality in the normal state.

The respective functions described in one or more embodiments can be implemented in single or plural processing circuits. The respective processing circuits include a programmed processing device, such as a processing device including an electric circuit. The processing device includes an application-specific integrated circuit (ASIC) configured to execute the functions described in one or more embodiments and conventional circuit components.

One or more embodiments described above are an example of the present invention. It should be understood that the present invention is not intended to be limited to these embodiments, and various modifications can be made, in addition to these embodiments, depending on the design without departing from the scope of the technical idea of the present invention.

While one or more embodiments described above have been illustrated with the multi-axis operating robot 200 as an operating device for assembling vehicles, the operating device is not limited to this case. The operating device may be any machine for executing predetermined operations, such as a multi-axis machine, a single-axis machine, and an operating device with no drive axis for assembling machines other than vehicles.

REFERENCE SIGNS LIST

1 INPUT UNIT
2 FIRST MEMORY
3 ABNORMALITY DETERMINATION UNIT
4 OUTPUT UNIT
5 OPERATION UNIT
6 UPDATE UNIT
7 DETERMINATION ALGORITHM
7a DETECTION ALGORITHM (FIRST DETERMINATION ALGORITHM)
7b SORTING RULE (SECOND DETERMINATION ALGORITHM)
200 OPERATING ROBOT (OPERATING DEVICE)

The invention claimed is:
1. An abnormality determination device comprising:
an microcomputer to which a signal output from an operating robot for executing a predetermined operation is input;
a first auxiliary storage configured to store a determination algorithm for determining a predetermined abnormality of the operating robot;
the microcomputer configured to determine the predetermined abnormality of the operating robot in accordance with the signal and the determination algorithm;
an display device including a display screen configured to output a determination result regarding the predetermined abnormality made by the microcomputer to a user;
an user interface (UI) configured to receive an input of wrong determination information indicating that the determination result is wrong or correct determination information indicating that the determination result is correct from the user; and
the microcomputer configured to update the determination algorithm stored in the first auxiliary storage in accordance with the wrong determination information or correct determination information received by the UI.

2. The abnormality determination device according to claim 1, wherein:
the determination result regarding the predetermined abnormality is information indicating that the operating robot has one abnormality included in the predetermined abnormality; and
the wrong determination information or correct determination information is one of:
(1) information indicating no occurrence of the corresponding one abnormality;
(2) information indicating an occurrence of another abnormality other than the corresponding one abnormality; and
(3) information indicating an occurrence of the corresponding one abnormality.

3. The abnormality determination device according to claim 1, wherein the determination algorithm includes:
a first determination algorithm for determining a presence or absence of the predetermined abnormality of the operating robot; and
a second determination algorithm for determining a type of abnormality caused in the operating robot.

4. The abnormality determination device according to claim 1, wherein the display device including a display screen and the UI are configured to be integrated together, the display device including a display screen including a display screen to display an image indicating the determination result and an image for receiving the input of the wrong determination information or correct determination information simultaneously on the display screen.

5. The abnormality determination device according to claim 4, wherein
the image for receiving the input of the wrong determination information or correct determination information includes a plurality of selectable optional items created according to the determination result; and
the microcomputer updates the determination algorithm in accordance with the wrong determination information or correct determination information included in the optional item selected from the optional items by the UI.

6. The abnormality determination device according to claim 5, wherein:
the determination algorithm includes a first determination algorithm for determining a presence or absence of the predetermined abnormality of the operating robot and a second determination algorithm for determining a type of abnormality caused in the operating robot; and
the microcomputer updates both the first determination algorithm and the second determination algorithm in accordance with the wrong determination information or correct determination information included in the optional item selected from the optional items by the UI.

7. The abnormality determination device according to claim 1, wherein the display device including a display screen includes a display screen to display an image indicating the determination result and an image for receiving an input of a presence or absence of maintenance work to be made for the predetermined abnormality included in the determination result simultaneously on the display screen.

8. The abnormality determination device according to claim 7, wherein the microcomputer updates the determination algorithm when the UI executes an operation of the input of the presence or absence of the maintenance work to be made for the predetermined abnormality.

9. The abnormality determination device according to claim 1, wherein the wrong determination information or correct determination information includes at least either information indicating that a presence or absence of abnormality is not clear or information indicating that a type of abnormality is not clear.

10. The abnormality determination device according to claim 9, further comprising a second auxiliary storage configured to store the signal output from the operating robot corresponding to the determination result when at least either the information indicating that the presence or absence of abnormality is not clear or the information indicating that the type of abnormality is not clear is input as the wrong determination information or correct determination information by the UI.

11. The abnormality determination device according to claim 1, wherein the determination algorithm includes at least either a positive determination algorithm that determines that the operating robot has the predetermined abnormality or a passive determination algorithm that determines that the operating robot does not have the predetermined abnormality.

12. An abnormality determination method comprising:
receiving a signal output from an operating robot for executing a predetermined operation;
determining a predetermined abnormality of the operating robot in accordance with the signal and a determination algorithm, stored in a first auxiliary storage and executable on a processor, that, when executed, determines the predetermined abnormality of the operating robot;
outputting a determination result regarding the predetermined abnormality to a user;
receiving an input of wrong determination information indicating that the determination result is wrong or correct determination information indicating that the determination result is correct from the user; and
updating the determination algorithm in accordance with the true-or-false wrong determination information or correct determination information received.

13. The abnormality determination device according to claim 1, wherein the UI configured to receive the input of wrong determination information or correct determination information receives the input based on decided from maintenance work of the operating robot, executed by the user.

* * * * *